US011228431B2

(12) United States Patent
Bush (10) Patent No.: US 11,228,431 B2
(45) Date of Patent: Jan. 18, 2022

(54) COMMUNICATION SYSTEMS AND METHODS FOR AUTHENTICATING DATA PACKETS WITHIN NETWORK FLOW

(71) Applicant: General Electric Company, Schenectady, NY (US)

(72) Inventor: Stephen Francis Bush, Latham, NY (US)

(73) Assignee: General Electric Company, Schenectady, NY (US)

( * ) Notice: Subject to any disclaimer, the term of this patent is extended or adjusted under 35 U.S.C. 154(b) by 115 days.

(21) Appl. No.: 16/578,057

(22) Filed: Sep. 20, 2019

(65) Prior Publication Data

US 2021/0091935 A1    Mar. 25, 2021

(51) Int. Cl.
*H04L 9/08*    (2006.01)
*H04L 29/06*    (2006.01)

(52) U.S. Cl.
CPC .......... *H04L 9/0852* (2013.01); *H04L 9/0819* (2013.01); *H04L 63/061* (2013.01); *H04L 63/08* (2013.01)

(58) Field of Classification Search
CPC ..... H04L 9/0852; H04L 9/0819; H04L 63/08; H04L 63/061; H04L 9/3297; H04L 63/108; H04L 63/0254; H04L 63/123; H04L 63/0435; H04L 63/0281; H04L 63/0227

See application file for complete search history.

(56) References Cited

U.S. PATENT DOCUMENTS

| | | | | |
|---|---|---|---|---|
| 5,768,378 A | * | 6/1998 | Townsend | ........... G02F 1/13471 380/256 |
| 6,389,532 B1 | * | 5/2002 | Gupta | ................. H04L 63/0227 370/351 |
| 6,658,565 B1 | * | 12/2003 | Gupta | ..................... H04L 29/06 713/153 |
| 7,266,201 B1 | * | 9/2007 | Lin | .......................... H04L 9/32 380/277 |
| 7,430,295 B1 | | 9/2008 | Pearson et al. | |
| 7,515,716 B1 | | 4/2009 | Elliott | |
| 8,082,443 B2 | | 12/2011 | Troxel et al. | |
| 8,483,394 B2 | | 7/2013 | Nordholt et al. | |

(Continued)

FOREIGN PATENT DOCUMENTS

WO    2019079890 A1    5/2019

*Primary Examiner* — Aravind K Moorthy
(74) *Attorney, Agent, or Firm* — The Small Patent Law Group LLC; Philip S. Hof (57) ABSTRACT

A communication system includes a first quantum key distribution device and an intermediary device. The first quantum key distribution device is configured to be coupled to a second quantum key distribution device over a quantum channel and to generate a shared key with the second quantum key distribution device based on a quantum state transmitted along the quantum channel. The intermediary device is disposed along a communication pathway within a network between a sender device and a receiver device. The intermediary device is communicatively connected to the first quantum key distribution device and configured to utilize the shared key to authenticate one or more data packets communicated from the sender device along the communication pathway by examining the one or more data packets for a presence of an information pattern that is associated with the shared key.

21 Claims, 3 Drawing Sheets

(56) References Cited

U.S. PATENT DOCUMENTS

| | | |
|---|---|---|
| 9,184,912 B2 | 11/2015 | Harrington |
| 9,246,674 B2 | 1/2016 | Brainis et al. |
| 9,509,506 B2 | 11/2016 | Hughes et al. |
| 10,326,591 B2 | 6/2019 | Yuan et al. |
| 10,397,115 B1* | 8/2019 | Hasani ............... H04L 45/7453 |
| 10,552,120 B1* | 2/2020 | Vakili .................... G06F 7/588 |
| 11,038,852 B2* | 6/2021 | Li ........................ H04L 63/20 |
| 2003/0002674 A1* | 1/2003 | Nambu ................ H04L 9/0852 380/256 |
| 2005/0138352 A1* | 6/2005 | Gauvreau ............. H04L 9/3247 713/153 |
| 2005/0180575 A1* | 8/2005 | Maeda ................. H04L 7/0075 380/278 |
| 2005/0249352 A1* | 11/2005 | Choi ..................... H04L 9/0852 380/286 |
| 2006/0242543 A1* | 10/2006 | LaVigne ............... H04L 1/0061 714/776 |
| 2007/0195774 A1* | 8/2007 | Sherman ................ H04L 69/16 370/392 |
| 2010/0299526 A1* | 11/2010 | Wiseman ............. H04L 63/061 713/171 |
| 2011/0038378 A1* | 2/2011 | Carter .................... H04L 69/26 370/400 |
| 2011/0085666 A1* | 4/2011 | Hicks ................... H04L 9/0852 380/278 |
| 2013/0083926 A1* | 4/2013 | Hughes ..................... H04L 9/08 380/278 |
| 2013/0089206 A1* | 4/2013 | Englund ............... H04L 9/0852 380/278 |
| 2013/0097658 A1* | 4/2013 | Cooper ............... H04L 63/0209 726/1 |
| 2013/0101121 A1* | 4/2013 | Nordholt ............... H04L 9/3226 380/279 |
| 2014/0010234 A1* | 1/2014 | Patel ...................... H04L 45/74 370/392 |
| 2014/0068765 A1* | 3/2014 | Choi .................... H04L 63/1416 726/23 |
| 2014/0112478 A1* | 4/2014 | Arahira ................ H04L 9/0852 380/278 |
| 2014/0133652 A1* | 5/2014 | Oshida ................. H04L 9/0897 380/255 |
| 2016/0021066 A1* | 1/2016 | Parvathaneni ...... H04W 12/033 713/171 |
| 2016/0127127 A1* | 5/2016 | Zhao .................... H04L 9/0852 713/171 |
| 2016/0149700 A1* | 5/2016 | Fu ........................ H04L 9/0858 380/278 |
| 2016/0218867 A1* | 7/2016 | Nordholt ............... H04L 9/0852 |
| 2016/0234017 A1* | 8/2016 | Englund ............ H04B 10/0795 |
| 2016/0248581 A1* | 8/2016 | Fu ........................ H04L 9/0858 |
| 2016/0359626 A1* | 12/2016 | Fu ........................ H04L 9/0858 |
| 2016/0366094 A1* | 12/2016 | Mason ................ H04L 61/2038 |
| 2016/0378949 A1* | 12/2016 | Fu ........................ H04L 9/0852 705/2 |
| 2017/0033926 A1* | 2/2017 | Fu ........................ H04L 9/0858 |
| 2017/0054555 A1* | 2/2017 | Yuan ...................... H04L 9/14 |
| 2017/0214525 A1* | 7/2017 | Zhao ................... H04W 12/041 |
| 2017/0331623 A1* | 11/2017 | Fu ......................... G06F 21/602 |
| 2017/0338951 A1* | 11/2017 | Fu ........................... G06F 21/10 |
| 2017/0346627 A1* | 11/2017 | Alleaume ........... H04J 14/0227 |
| 2018/0013556 A1* | 1/2018 | Saavedra ................ H04L 67/12 |
| 2018/0062836 A1* | 3/2018 | Tanizawa .................. H04L 9/14 |
| 2018/0062837 A1* | 3/2018 | Tanizawa ............. H04L 9/0852 |
| 2018/0109377 A1* | 4/2018 | Fu ........................ H04L 9/0855 |
| 2018/0109378 A1* | 4/2018 | Fu ........................ H04L 9/0852 |
| 2018/0176091 A1* | 6/2018 | Yoon ................... H04L 41/0896 |
| 2018/0294969 A1* | 10/2018 | Holness .................... H04L 9/32 |
| 2018/0351734 A1* | 12/2018 | Zhao .................... G06F 21/6218 |
| 2018/0367301 A1* | 12/2018 | Su ........................ H04L 9/0894 |
| 2018/0367309 A1 | 12/2018 | Reinhold |
| 2018/0375650 A1* | 12/2018 | Legre .................... G06F 7/588 |
| 2019/0036821 A1* | 1/2019 | Levy .................... G06F 12/0868 |
| 2019/0058694 A1* | 2/2019 | Hussain ............... H04L 12/4633 |
| 2019/0097792 A1* | 3/2019 | Howe ....................... H04L 1/00 |
| 2019/0123847 A1* | 4/2019 | Bush ..................... H04L 63/12 |
| 2019/0149327 A1* | 5/2019 | Yuan .................... H04L 9/0858 380/255 |
| 2019/0278604 A1* | 9/2019 | Zhang ................. G06F 9/30196 |
| 2019/0280983 A1* | 9/2019 | Bert ...................... H04L 47/30 |
| 2019/0312723 A1* | 10/2019 | Guo ...................... H04L 9/0852 |
| 2019/0349392 A1* | 11/2019 | Wetterwald ........... H04J 3/0667 |
| 2019/0379536 A1* | 12/2019 | Han ...................... H04L 9/0852 |
| 2019/0379603 A1* | 12/2019 | Dhanabalan ........ H04L 43/0894 |
| 2019/0394031 A1* | 12/2019 | Deng ..................... H04L 9/0643 |
| 2020/0067704 A1* | 2/2020 | Zbinden ................ H04B 10/70 |
| 2020/0084222 A1* | 3/2020 | William ................ H04L 9/0869 |
| 2020/0153619 A1* | 5/2020 | Ribordy ................ H04L 9/0852 |
| 2020/0244441 A1* | 7/2020 | Madineni ............. H04L 9/0637 |
| 2020/0244576 A1* | 7/2020 | Wetterwald ............ H04L 45/20 |
| 2020/0328886 A1* | 10/2020 | Newton ................ H04L 9/0869 |
| 2020/0351087 A1* | 11/2020 | Mccandlish .......... H04L 9/0897 |
| 2021/0044433 A1* | 2/2021 | Hay ..................... G06F 9/45558 |
| 2021/0067331 A1* | 3/2021 | Chen .................... H04L 9/0852 |
| 2021/0083863 A1* | 3/2021 | Bush .................... H04L 9/0852 |
| 2021/0083864 A1* | 3/2021 | Bush .................... H04L 9/0819 |
| 2021/0119786 A1* | 4/2021 | Bucklew ................ H04B 10/70 |

* cited by examiner

COMMUNICATION SYSTEMS AND METHODS FOR AUTHENTICATING DATA PACKETS WITHIN NETWORK FLOW

GOVERNMENT LICENSE RIGHTS

This invention was made with government support under contract number DE-OE0000894 awarded by the Department of Energy. The government has certain rights in the invention.

FIELD

The subject matter described herein relates to securing communications within computerized communication networks.

BACKGROUND

The IEEE 802.1 Time-Sensitive Networking Task Group has created a series of standards that describe how to implement deterministic, scheduled Ethernet frame delivery within an Ethernet network. Time-sensitive networking benefits from advances in time precision and stability to create efficient, deterministic traffic flows in an Ethernet network. Time-sensitive networks can be used in safety critical environments, such as control systems for automated industrial systems. In these environments, timely and fast control of machinery is needed to ensure that operators and equipment at or near the machinery being controlled are not hurt or damaged. Encryption systems, such as quantum key distribution systems, may be used in these networks to ensure that malevolent actors do not hack into or otherwise interfere with communication through the time-sensitive networks and cause damage or harm.

Quantum key distribution systems include quantum devices connected by a quantum channel. The quantum devices utilize quantum mechanics to produce a shared random secret key that may be known only to the quantum devices. The shared random key is used to encrypt and decrypt messages communicated between the quantum devices. Information can be encoded in quantum states (e.g., qubits) instead of bits, which enables detection of a third-party end device attempting to detect or listen in to the communications using the quantum key.

Although the shared key is used for encrypting and decrypting messages communicated along the network, quantum key distribution may not be able to secure the safe, uninterrupted transmission of the messages through the network as the messages hop from node to node between the talking quantum devices. Classical devices that form the nodes of the network may risk tampering by a malevolent actor, such as by plugging a cable into an open port on a switch device in an attempt to redirect, steal, examine, delay, or add data packets. Even if the malevolent actor that tampers with a classical device is not able to read or decrypt the messages, the tampering may cause undesirable interruptions and/or interference in the network throughput, resulting in delays or missed packets that disrupt the schedule of the time-sensitive network.

SUMMARY

In one or more embodiments, a communication system is provided that includes a first quantum key distribution device and an intermediary device. The first quantum key distribution device is configured to be coupled to a second quantum key distribution device over a quantum channel and to generate a shared key with the second quantum key distribution device based on a quantum state transmitted along the quantum channel. The intermediary device is disposed along a communication pathway within a network between a sender device and a receiver device. The intermediary device is communicatively connected to the first quantum key distribution device and configured to utilize the shared key to authenticate one or more data packets communicated from the sender device along the communication pathway by examining the one or more data packets for a presence of an information pattern that is associated with the shared key.

In one or more embodiments, a method for securing communications is provided that includes generating a shared key using a first quantum key distribution device and a second quantum key distribution device connected to each other by a quantum channel. The shared key is generated based on a quantum state transmitted along the quantum channel. The method includes receiving one or more data packets at an intermediary device disposed along a communication pathway within a network between a sender device and a receiver device. The intermediary device is communicatively connected to the first quantum key distribution device. The method also includes authenticating the one or more data packets by examining the one or more data packets at the intermediary device for a presence of an information pattern that is associated with the shared key.

In one or more embodiments, a communication system is provided that includes a first quantum key distribution device, a receiver device, and an intermediary device. The first quantum key distribution device is configured to be coupled to a second quantum key distribution device over a quantum channel and to generate a shared key with the second quantum key distribution device based on a quantum state transmitted along the quantum channel. The receiver device is disposed within a network and is configured to receive the shared key from the first quantum key distribution device via a first communication link. The intermediary device is disposed along a communication pathway within the network between the receiver device and a sender device that communicates one or more data packets along the communication pathway. The intermediary device is communicatively connected to the first quantum key distribution device via a different, second communication link. The intermediary device is configured to utilize the shared key to authenticate at least one of the one or more data packets as a valid packet by detecting, in each valid packet, an information pattern that is associated with the shared key. The receiver device is configured to receive the valid packet along the communication pathway and decrypt information within the valid packet using the shared key received via the first communication link.

BRIEF DESCRIPTION OF THE DRAWINGS

The inventive subject matter will be better understood from reading the following description of non-limiting embodiments, with reference to the attached drawings, wherein below.

DETAILED DESCRIPTION

Reference now will be made in detail to embodiments of the present disclosure, one or more examples of which are illustrated in the drawings. Each example is provided by way of explanation of the present disclosure and is not a limitation of the present disclosure. Features illustrated or described as part of one embodiment can be used with another embodiment to yield a still further embodiment. Thus, it is intended that the present disclosure covers such modifications and variations as come within the scope of the appended claims and their equivalents.

One or more embodiments of the inventive subject matter described herein relate to systems and methods that increase cybersecurity in time-sensitive networking. The cybersecurity can be increased by examining and authenticating messages or parts of messages within the network flow. The network flow may refer to information (e.g., signals, data packets, frames, messages, etc.) communicated through the network between two computing devices (e.g., end devices) that are communicating with each other. For example, the data packets generated by a sender device may represent part of the network flow as the data packets are communicated across the network, node-by-node, until the data packets ultimately are received at the intended recipient or receiver device. The nodes represent network devices that are connected to each other via communication links, and may include bridges, switches, computing devices, and the like. According to one or more embodiments, the messages may be examined at one or more of the nodes that are located along a communication pathway between the sender device and the receiver device.

The data packets are examined to authenticate the data packets within the network flow prior to the data packets reaching the intended receiver device. In one or more embodiments, keys are utilized for the examination process. For example, the device that examines the data packets may be programmed to look into each data packet received at that device for a specific pattern of information within the corresponding data packet. The information pattern may include a specific arrangement of bits, qubits, or other data embedded within the packet. The information pattern is associated with a key, such that the pattern represents the key or a portion of the key, is generated based on a transformation of the key, or the like. The device is configured to only authenticate the data packets that are determined to have the information pattern. Data packets that include the information pattern are valid packets that aggregate to represent a message communicated through the network from a sender device to a receiver device. Data packets that lack the information pattern are invalid packets that may be the result of a malevolent intention to add extraneous data packets into the network or modify existing data packets. The key that is used for authenticating the data packets within the network flow may be a shared key generated according to quantum key distribution.

At least one technical effect of the subject matter described herein provides for increased security and integrity of network flow through a communication network by authenticating (or validating) individual data packets that are received at an intermediary device in the network between two communicating devices. By examining the data packets and detecting invalid or unauthorized packets before the packets reach the intended recipient, the system may be able to take remedial action to prevent or reduce the extent of disturbance or damage caused by the invalid packets relative to waiting until the invalid packets are received at the recipient device. For example, invalid packets may be dropped or redirected before the invalid packets cause delays or otherwise interfere with the network throughput. Furthermore, the use of time-sensitive networking and quantum key distribution also can help ensure the safe and secure communication of information that is communicated in a time critical manner.

Figure 1:
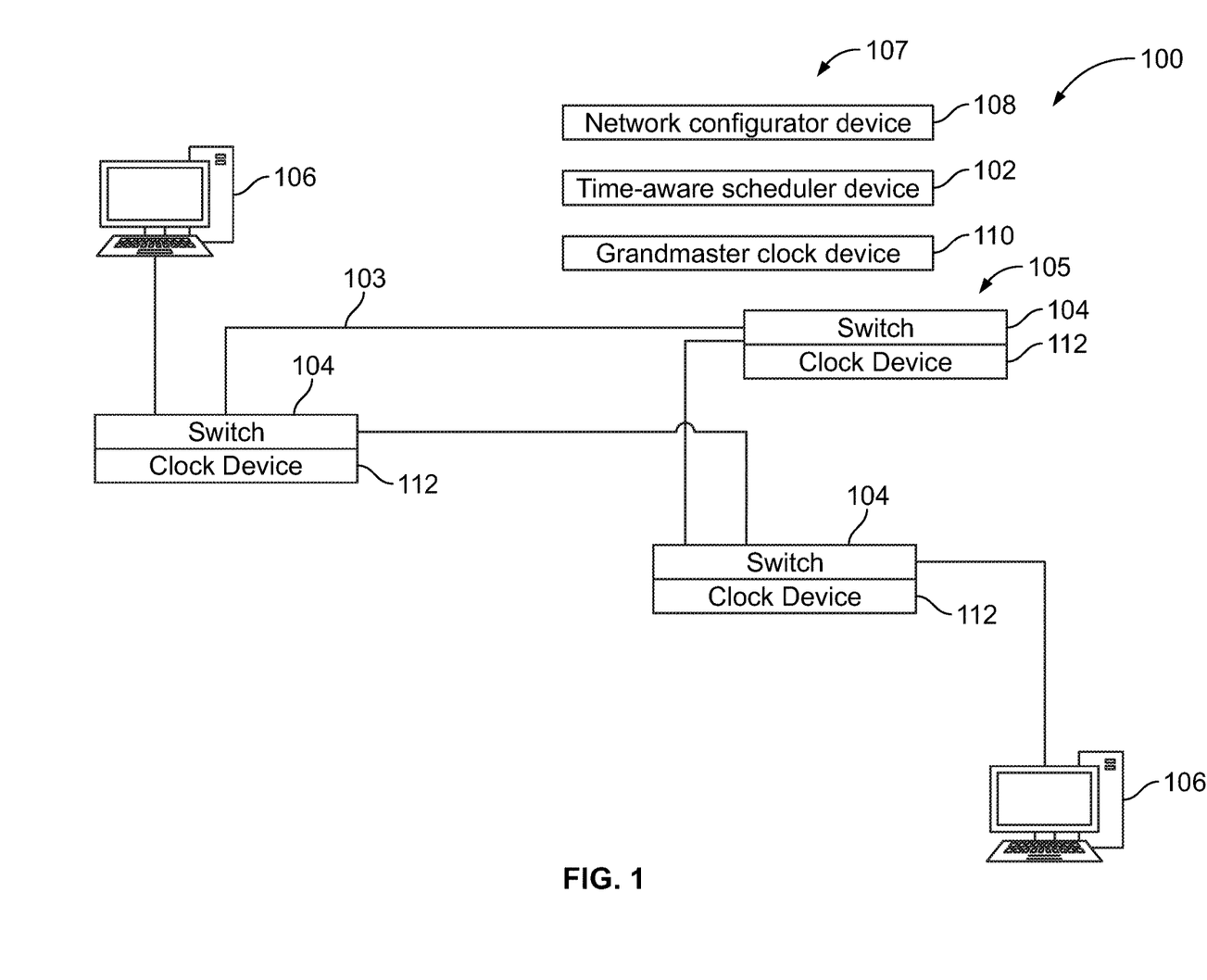
FIG. 1 schematically illustrates a network control system of a time-sensitive network in accordance with embodiments herein.

FIG. 1 schematically illustrates one embodiment of a network control system 107 of a time-sensitive network 100. The components shown in FIG. 1 represent hardware circuitry that includes and/or is connected with one or more processors (e.g., one or more microprocessors, field programmable gate arrays, and/or integrated circuits) that operate to perform the functions described herein. The components of the network 100 can be communicatively coupled with each other by one or more wired and/or wireless connections. Not all connections between the components of the network 100 are shown herein. The network 100 can be a time-sensitive network in that the network 100 is configured to operate according to one or more of the time-sensitive network standards of IEEE, such as the IEEE 802.1AS™-2011 Standard, the IEEE 802.1Q™-2014 Standard, the IEEE 802.1Qbu™-2016 Standard, and/or the IEEE 802.3Br™-2016 Standard. Time-sensitive networks can be used in life-critical industrial control applications, such as the power grid, where cybersecurity is important.

The network 100 includes several nodes 105 formed of network switches (or bridges) 104 and associated clocks 112 ("clock devices" in FIG. 1). While only a few nodes 105 are shown in FIG. 1, the network 100 can be formed of many more nodes 105 distributed over a large geographic area. The network 100 can be an Ethernet network that communicates data signals along, through, or via communication links 103 between end devices 106 (e.g., computers, control systems, sensors, etc.) through or via the nodes 105. The communication links 103 can represent one or more of a variety of different communication elements, such as Ethernet links, optical links, copper links, and the like. The data signals are communicated as data packets sent between the nodes 105 on a schedule of the network 100, with the schedule restricting what data signals can be communicated by each of the nodes 105 at different times.

For example, different data signals can be communicated at different repeating scheduled time periods based on traffic classifications of the signals. Some signals are classified as time-critical traffic while other signals are classified as best effort traffic. The time-critical traffic can be data signals that need or are required to be communicated at or within designated periods of time to ensure the safe operation of a powered system. The best effort traffic includes data signals that are not required to ensure the safe operation of the powered system, but that are communicated for other purposes (e.g., monitoring operation of components of the powered system).

The control system 107 includes a time-aware scheduler device 102 that enables each interface of a node 105 to transmit an Ethernet frame (e.g., between nodes 105 from one computer device 106 to another device 106) at a prescheduled time, creating deterministic traffic flows while sharing the same media with legacy, best-effort Ethernet traffic. The time-sensitive network 100 has been developed to support hard, real-time applications where delivery of frames of time-critical traffic must meet tight schedules without causing failure, particularly in life-critical industrial control systems. The scheduler device 102 computes a schedule that is installed at each node 105 in the network 100. This schedule dictates when different types or classification of signals are communicated by the switches 104.

The scheduler device 102 remains synchronized with a grandmaster clock device 110 that includes a clock to which clock devices 112 of the nodes 105 are synchronized. A centralized network configurator device 108 of the control system 107 is comprised of software and/or hardware that has knowledge of the physical topology of the network 100 as well as desired time-sensitive network traffic flows. The configurator device 108 can be formed from hardware circuitry that is connected with and/or includes one or more processors that determine or otherwise obtain the topology information from the nodes 105 and/or user input. The hardware circuitry and/or processors of the configurator device 108 can be at least partially shared with the hardware circuitry and/or processors of the scheduler device 102.

The topology knowledge of the network 100 can include locations of nodes 105 (e.g., absolute and/or relative locations), which nodes 105 are directly coupled with other nodes 105, etc. The configurator device 108 can provide this information to the scheduler device 102, which uses the topology information to determine the schedules for communication of secret information (e.g., quantum keys and other encryption keys) and messages between the devices 106 (that may be encrypted using the secret information). The configurator device 108 and/or scheduler device 102 can communicate the schedule to the different nodes 105.

A link layer discovery protocol can be used to exchange the data between the configurator device 108 and the scheduler device 102. The scheduler device 102 communicates with the time-aware systems (e.g., the switches 104 with respective clocks 112) through a network management protocol. The time-aware systems implement a control plane element that forwards the commands from the centralized scheduler device 102 to their respective hardware.

Figure 2:
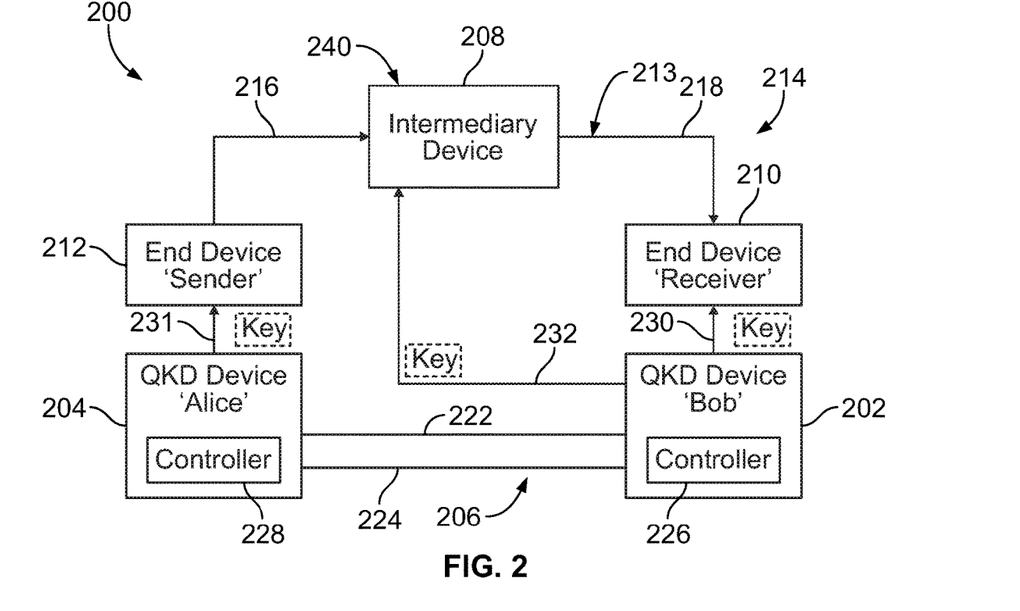
FIG. 2 illustrates a communication system that uses shared keys to authenticate data packets within a network flow in accordance with embodiments herein.

FIG. 2 illustrates a communication system 200 that uses shared keys to authenticate data packets within a network flow according to an embodiment. The communication system 200 includes a first quantum key distribution (QKD) device 202 and a second QKD device 204. A quantum channel 222 is coupled to both the first and second QKD devices 202, 204 and provides a communication pathway between the two devices 202, 204. The communication system 200 includes a first end device 210 communicatively connected to the first QKD device 202, and a second end device 212 communicatively connected to the second QKD device 204. An intermediary device 208 is disposed between the first and second QKD devices 202, 204 along a communication pathway 213 through a network 214.

In an embodiment, the network 214 in FIG. 2 may represent the time-sensitive network 100 shown in FIG. 1. The first and second end devices 210, 212 may represent the end devices 106 shown in FIG. 1. The end devices 210, 212 may be computing devices such as computers, controllers, sensors, and the like, that send and receive control signals, data signals, status signals, confirmation signals, and the like. The intermediary device 208 may represent one of the switches 104 (or bridges) of the time-sensitive network 100. For example, the intermediary device 208 may be an Ethernet switch. Alternatively, the intermediary device 208 may be a communication device other than a switch or bridge.

The communication system 200 may include one or more processors that represent the network configurator device 108 and/or the time-aware scheduler device 102 shown in FIG. 1.

The first and second end devices 210, 212 are configured to communicate messages to each other across the network 214. For example, each message may be communicated as multiple data packets or frames along one or more communication pathways through the network 214 from the sender device 210 or 212 to the recipient or receiver device 212 or 210, respectively. The illustrated embodiment only shows the single communication pathway 213 between the devices 210, 212. The pathway 213 is defined by a communication link 216, the intermediary device 208, and another communication link 218. The communication link 216 extends from the end device 212 to the intermediary device 208, and the communication link 218 extends from the intermediary device 208 to the end device 210. The communication links 218 may be classical communication pathways, such as cables that include one or more electrically conductive (e.g., metallic) wires and/or one or more optical fibers. For example, the cables may be serial cables (e.g., RS-232 cables), USB cables, Ethernet cables, or the like. The communication links 216, 218 may mechanically and electrically connect to corresponding ports of the intermediary device 208. In an alternative embodiment, the intermediary device 208 is communicatively connected to the end devices 210, 212 through a wireless protocol, which may include a cellular connection, or a wireless connection through an intervening hardware device such as a router, server, or the like.

A message communicated from the second end device 212, referred to herein as sender device 212, to the first end device 210, referred to herein as receiver device 210, is conveyed as one or more data packets through the communication pathway 213. The data packets are conveyed from the sender device 212 through the link 216 to the intermediary device 208, and from the intermediary device 208 through the link 218 to the receiver device 210. Although the communication pathway 213 only includes a single device (e.g., the intermediary device 208) and two links 216, 218 connecting the end devices 210, 212 in FIG. 2, alternatively additional links and one or more additional intermediary communication devices (such as switches) may be disposed along the communication pathway 213. For example, the one or more data packets may "hop" along links between multiple intermediary devices (or nodes) before arriving at the receiver device 210. Furthermore, the additional links and communication devices may define additional potential communication pathways connecting the two devices 210, 212. The data packets that represent a single message may be distributed among multiple different communication pathways before arriving at the receiver device 210. Therefore, the data packets received at the intermediary device 208 may represent only a portion of a single message or portions of multiple messages. Although the end device 212 is referred to as the sender and the end device 210 is referred to as the receiver, the roles of the devices 210, 212 may be reversed for communicating other messages from the device 210 to the device 212.

In one or more embodiments, the network 214 is a time-sensitive network. For example, the message-defining data packets may be communicated between the devices 210, 212 through the network 214 on a schedule generated by the scheduler device 102 (shown in FIG. 1). The intermediary device 208 may receive data packets within a first time period and may wait for a designated amount of time before communicating the data packets to the receiver device 210 (or another network device) within a second time period. The time periods may be relatively short and precisely-controlled to provide deterministic traffic flow through the network 214. In an embodiment, a message communicated from the sender device 212 to the receiver device 210 may be a time-critical message.

The first and second QKD devices 202, 204 generate shared, random keys for network cybersecurity. As described herein, these shared keys may also be utilized for authenticating data packets received at the intermediary device 208 as the data packets are communicated through the network 214 from the sender device 212 to the receiver device 210.

The QKD devices 202, 204 can use quantum mechanics in the form of photonics to create and share the keys. Each shared key is based on one or more quantum states (or quantum signals) transmitted between the devices 202, 204 along the quantum channel 222. The quantum channel 222 may include one or more optical fibers. Alternatively, the quantum channel 222 may be available bandwidth space within the network 214. A third-party eavesdropper can be detected by causing a change to the quantum state. Specifically, when the quantum state is disturbed, an anomaly in the signal is detected. A threshold number of anomalies detected indicates a third party is attempting to gain access to the signal. The anomalies may be detected using quantum bit error rate, with qubits per second in error indicating or representing the anomalies.

In an embodiment, the first QKD device 202, referred to as "Bob", receives a quantum state (or signal) via the quantum channel 222 from the second QKD device 204, referred to as "Alice". For example, the second QKD device 204 may include a laser or other photon generating source that emits photons into the quantum channel 222. While in this example the second QKD device 204 transmits the quantum state to the first QKD device 202, alternatively the first QKD device 202 transmits the quantum state and is considered "Alice" while the second QKD device 204 receives the quantum state and is considered "Bob". The quantum state can be encoded in various ways, including polarization, time-bin encoding, entanglement, and the like. Time-bin encoding implements the superposition of different relative phases onto the same photon. Quantum measurement is implemented by measuring the time of arrival of the photon. The time-sensitive network 214 may provide precise and stable time synchronization for controlling the quantum channel 222.

Then, classical processing may be performed by the QKD devices 202, 204 to refine and extract the key material. This processing can involve the transmission of information between the QKD devices 202, 204 along a classical channel 224 that communicatively links the two QKD devices 202, 204. The classical channel 224 does not leverage quantum states. The classical processing may include sifting or extraction of the raw key, quantum bit error rate estimation, key reconciliation, and/or privacy amplification and authentication. Implementing the classical channel 224 in a time-sensitive network 214 ensures robust and deterministic generation of the shared keys and/or other secret information. The classical channel 224 may include one or more electrically conductive (e.g., metallic) wires or cables, one or more optical fibers, or wireless transmission media. Optionally, the quantum channel 222 may be bundled with the classical channel 224 to define a communication cable 206 between the QKD devices 202, 204. For example, the quantum channel 222 may be commonly housed with the classical channel 224 within a cable jacket of the communication cable 206. In a first non-limiting example, the cable 206 may include one or more electrical wires that represent the classical channel 224 and one or more optical fibers that represent the quantum channel 222. In a second non-limiting example, the same one or more optical fibers may be used to define both the quantum channel 222 and the classical channel 224.

The first QKD device 202 may include a respective controller 226 that has one or more processors. The second QKD device 204 may also include a respective controller 228 with one or more processors. The controllers 226, 228 may be configured to execute programs or protocols to determine how and when the shared keys are generated. One or both of the controllers 226, 228 may also be configured to detect errors in the quantum signal for determining the presence of an eavesdropper or hacker. Each of the controllers 226, 228 may include a respective quantum transmitter, a quantum receiver, and quantum key circuitry. The quantum transmitter forms and transmits a quantum signal including quantum states sent from the QKD device 204, for example, and received by the quantum receiver of the QKD device 202 via the quantum channel 222. In one example, the quantum transmitter is a laser that emits photons that are carried along an optical fiber. The quantum transmitter may form quantum states that include differing polarization states, orthogonal states, other conjugate variable states, entangled based states, or the like that may be received to provide a quantum key and/or other secret information. The quantum key circuitry may be able to receive and analyze quantum states to form the shared keys and to determine if an error has occurred.

The first and second QKD devices 202, 204 may be controlled to generate the shared, random keys at a designated rate. For example, the QKD devices 202, 204 may continuously generate new quantum keys at a designated frequency. The characteristics and parameters of the production of the shared keys, such as the rate at which the keys are produced, may be controlled by the network configurator device 108 (shown in FIG. 1), the scheduler device 102, control signals received from another device, or programmed instructions onboard one or both of the QKD devices 202, 204.

In the illustrated embodiment, the receiver device 210 is communicatively connected to the first QKD device 202 and the sender device 212 is communicatively connected to the second QKD device 204. In the illustrated embodiment, the receiver and sender devices 210, 212 are each separate and discrete from the corresponding connected QKD devices 202, 204. For example, the devices 210, 212 may be connected to the corresponding QKD devices 202, 204, respectively via electrically conductive pathways, such as first and second communication links 230, 231. The communication links 230, 231 may each include at least one electrically conductive wire, representing an Ethernet cable, an RS-232 type of cable, a coaxial cable, an unshielded twisted pair cable, or the like.

In an alternative embodiment, the receiver device 210 is mechanically integrated with the first QKD device 202 and/or the sender device 212 is mechanically integrated with the second QKD device 204. For example, the receiver device 210 may be mounted on or disposed within a common housing as the first QKD device 202. In a non-limiting example, the first QKD device 202 may be formed on a chip, a storage device, or another electrical device that is conductively coupled to the receiver device 210. The sender device 212 may be similarly integrated with the second QKD device 204. Thus, the current system and methodology may be used on existing quantum key distribution systems in which the QKD devices 202, 204 are standalone devices, or may be manufactured for integration onto and/or into the end devices 210, 212.

The sender device 212 receives shared keys from the QKD device 204, and the receiver device 210 receives shared keys from the connected QKD device 202. Each shared key received by the sender device 212 must match a corresponding shared key received by the receiver device 210 to enable successful communication of a message between the two devices 210, 212. For example, when the sender device 212 communicates a message to the receiver device 210, the sender device 212 may encrypt the message using a valid shared key. A valid shared key is a shared key that is used to encrypt and/or decrypt data during a designated validity lifetime of the key. Different shared keys may have different validity lifetimes. The shared keys may have one-time pads, such that the keys are replaced after every message. Using a one-time pad for both encryption and authentication may provide secure network communications, such as greater cybersecurity than one or more other encryption and/or authentication techniques.

The shared key may be used to encrypt multiple data packets of the message. Alternatively, different shared keys may be used to encrypt different packets of the same message. The receiver device 210 is configured to receive the data packets from the network 214 and decrypt the data packets using a matching valid shared key that is received from the QKD device 202.

In one or more embodiments, the intermediary device 208 is communicatively connected to the first QKD device 202. For example, a communication link 232 may extend from the QKD device 202 to the intermediary device 208, and shared keys may be communicated from the QKD device 202 to the intermediary device 208 along the communication link 232. The communication link 232 may represent a wired or wireless communication pathway. The shared keys may be encrypted before being conveyed along the communication link 232 to the intermediary device 208. The encryption may involve an Advanced Encryption Standard 256-bit (AES-256) key to provide an additional layer of security. In an embodiment, all keys distributed over classical channels, such as the communication links 216, 218, 230, 231, 232, are encrypted via at least an AES-256 key.

The intermediary device 208 is configured to utilize the shared key received from the QKD device 202 to authenticate one or more data packets communicated from the sender device 212 along the communication pathway 213 by examining the one or more data packets for a presence of an information pattern that is associated with the shared key. The intermediary device 208 may inspect or examine each data packet received at the intermediary device 208, although the intermediary device 208 is not a final destination device for the data packets. The intermediary device 208 is configured to authenticate the data packets that include the information pattern and does not authenticate data packets that lack the information pattern. Data packets that include the information pattern are classified or identified as valid packets and are communicated by the intermediary device 208 to the receiver device 210 (or another intervening device) according to a schedule of the time-sensitive network 214. Data packets that lack the information pattern are classified or identified as invalid packets and are not communicated by the intermediary device 208 to the receiver device 210. The invalid packets may be the result of a malevolent intention to interfere with the network 214 by adding extraneous data packets into the network 214 and/or modifying existing data packets.

The information pattern may be information that is embedded into the data packets by the sender device 212 or another device connected to the sender device 212. The information pattern may include or represent a series or sequence of bits, qubits, or other forms of information. The information pattern is associated with a shared key because the information pattern is generated or created using the shared key. In a non-limiting example, the information pattern may be a representation of the shared key, such as a portion of the key or an entirety of the key.

In another non-limiting example, the information pattern may be generated by applying a function to the shared key, such as a hash function, to transform and/or encrypt the shared key. For example, the information pattern associated with the shared key may be a hash-based message authentication code (HMAC) generated based on the shared key. The sender device 212 may include or be communicatively connected to a hash circuitry that is configured to generate the HMAC using the shared key from the QKD device 204. The HMAC uses a cryptographic key in conjunction with a hash function, such that the HMAC is essentially a scrambled message. The HMAC may be inserted or embedded into the data packets communicated from the sender device 212. In an embodiment, the intermediary device 208 may include or be communicatively connected to different hash circuitry that allows the intermediary device 208 to hash the designated segments of the received data packets to authenticate the data packets. For example, if the data packet is authentic or valid, the HMAC in the data packet may match or correspond to a pattern generated by the hash circuitry of the intermediary device 208. Alternatively, the intermediary device 208 may have access to the HMAC generated at the sender device 212 (such as via a communication link), and may authenticate a received data packet by comparing the HMAC in the data packet to the HMAC received at the intermediary device 208 which is used as the information pattern to which the packets are compared.

In order to operate within the short time frames of the time-sensitive network 214, the intermediary device 208 may be controlled to quickly examine each data packet received at a relatively high line speed, such as up to 100 Gb/s. The intermediary device 208 may achieve such high speeds by only examining a designated segment of each data packet, ignoring the remainder of each data packet outside of the designated segment. The designated segment may be the preamble, the header, or the like, and optionally may represent only a subsection of a segment. The intermediary device 208 includes one or more processors that are configured to take responsive action based on the examination of each data packet, as described below. In an embodiment, the network scheduler device 102 may be configured to accommodate for the time spent by the intermediary device 208 to examine the data packets when generating the schedule for the network 214. For example, the scheduler device 102 may increase a lag time for data packets received at the intermediary device 208 before the data packets are transmitted by the intermediary device 208. The lag time may be increased by a small fraction of time, such as a few milliseconds. During the lag time period, the intermediary device 208 examines the data packets, and may divert or drop invalid packets without communicating the invalid packets with the valid packets. Optionally, the intermediary device 208 may generate a control signal to notify or alert operators of the detection of one or more invalid packets.

In an embodiment, the intermediary device 208 includes a ternary content addressable memory (TCAM). The TCAM is a high-speed memory that may search its contents in a single clock cycle. The TCAM may enable a packet to be evaluated against an entire list in a lookup table stored on the TCAM. The TCAM may be a hardware component, such as a chip (e.g., silicon chip device), that is conductively coupled to and disposed on or within the intermediary device 208. The TCAM may be disposed at an input region 240 of the intermediary device 208, such that the TCAM may check the traffic entering the intermediary device 208. The TCAM may be programmed to quickly locate a designated segment of each data packet and determine whether the information within the designated segment matches the designated information pattern that is based on the quantum-generated shared key. In an alternative embodiment, a different approach could be used instead of the TCAM to perform the examination, such as an IEEE 802.1AE (MACsec) device or chip, an Ethernet encryptor device, or the like. The 802.1AE device and the Ethernet encryptor device may operate slower than the TCAM, so the network schedule may be generated to provide longer lag times at the intermediary device 208 relative to the lag times scheduled for the TCAM.

The information pattern associated with the shared key may change over time as new shared keys are generated. For example, the shared keys may have validity lifetimes that represent specific time periods at which the shared keys are considered valid. Each shared key may be utilized for authentication of the data packets only during its respective validity lifetime. Therefore, new information patterns may be generated and embedded into the data packets over time.

Figure 3:
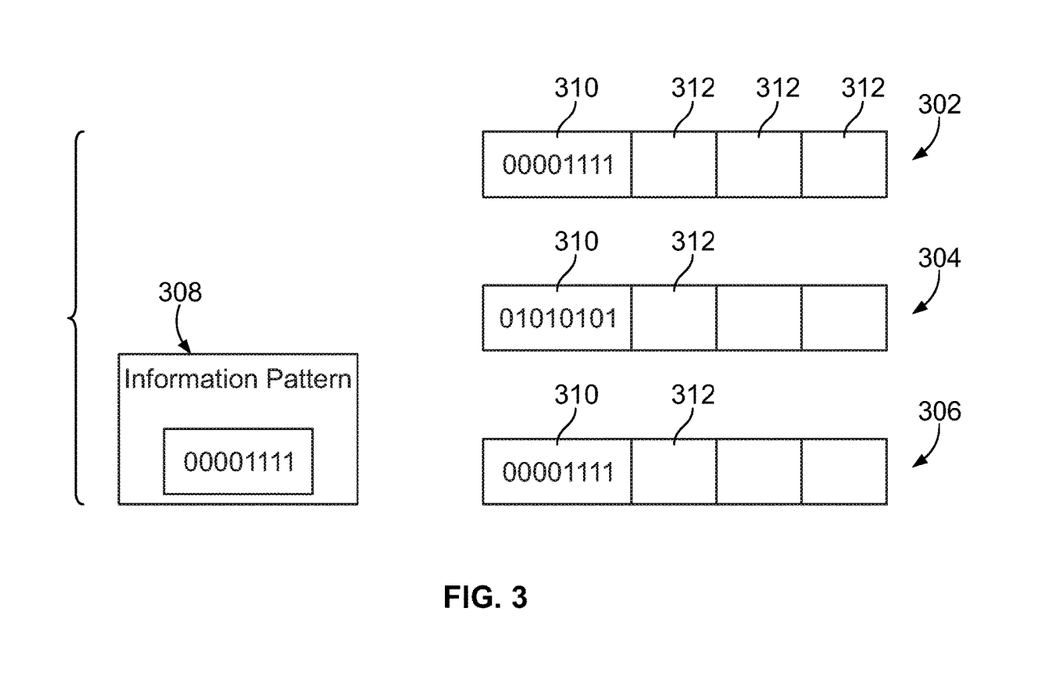
FIG. 3 is a schematic diagram illustrating three data packets and an information pattern associated with a shared key in accordance with embodiments herein.

With continued reference to FIG. 2, FIG. 3 is a schematic diagram illustrating three data packets 302, 304, 306 and an information pattern 308 associated with a shared key. The data packets 302, 304, 306 may be components of a message communicated from the sender device 212 to the receiver device 210 along the communication pathway 213. The intermediary device 208 has an information pattern 308 that is associated with a shared key. The information pattern 308 in the illustrated embodiment may be a bit pattern that includes binary code. For example, the bit pattern is shown as "00001111" in FIG. 3. The intermediary device 208 receives the three packets 302, 304, 306 along the communication pathway 213 and examines each one for the presence of the designated information pattern 308.

In an embodiment, the intermediary device 208 is programmed to examine only a designated segment 310 of each of the data packets 302, 304, 306. The intermediary device 208 ignores the information within other segments 312 of the packets 302, 304, 306. Although the designated segment 310 in FIG. 3 is shown at a left end of the packets 302, 304, 306, the designated segment 310 may be located at the opposite end or may be disposed within a middle region in an alternative embodiment. In the illustrated embodiment, the information within the designated segments 310 of the first and third data packets 302, 306 match the information pattern 308 of "00001111". The information within the designated segment 310 of the second data packet 304 is "01010101", so does not match the information pattern 308. The intermediary device 208 is configured to classify the first and third packets 302, 306 as valid, authenticated packets, and classifies the second packet 304 as an invalid, unauthenticated packet.

In an embodiment, the intermediary device 208 is controlled or programmed to handle valid data packets (e.g., packets 302 and 306) differently than invalid packets (e.g., packet 304) that lack the information pattern. For example, the intermediary device 208 is configured to communicate the valid packets along the communication pathway 213 towards the receiver device 210 during a designated time period according to the network schedule. In essence, the intermediary device 208 handles valid packets according to a scheduled plan for the packets by communicating the valid packets along a designated link at a designated time period. When the receiver device 210 receives the valid packets, the receiver device 210 is configured to utilize the shared key received from the QKD device 202 (via the communication link 230) to decrypt the information within the valid packets. For example, the receiver device 210 "reads" the message by decrypting and assembling the received data packets that were validated by the intermediary device 208.

Upon identifying an invalid data packet (e.g., packet 304), the intermediary device 208 deviates from the scheduled plan and prevents the communication of the invalid data packet to the scheduled destination. Thus, the invalid packets are not communicated to the receiver device 210. Only the valid packets are received by the receiver device 210. Instead, the intermediary device 208 may take one or more responsive actions. In a non-limiting example, the intermediary device 208 may redirect the invalid packet to a device outside of the communication pathway 213, such as a storage device to hold the packet for further analysis or a processing device to analyze the packet. In another non-limiting example, the intermediary device 208 may drop the invalid packets by not communicating the packets at all (e.g., deleting the invalid packets). In yet another non-limiting example, the intermediary device 208 may generate a control signal to notify an operator of the detection of one or more invalid packets. For example, the control signal may cause a light effect, may cause the generation of a text-based message, may cause a sound effect (e.g., beep, etc.). The operator may be notified to check for evidence of a malevolent actor tampering with the network 214. In another non-limiting example, the network flow of data packets determined to include an invalid message authentication may be dynamically rescheduled to redirect the network flow. For example, the scheduler device 102 may reschedule the invalid flow to take a different spatial and/or temporal path without interrupting other data flows through the network 214. The different spatial path includes communicating the invalid flow along different communication links and devices (e.g., nodes) than previously scheduled. The different temporal path includes communication the invalid flow at time periods that differ from the previously-scheduled communication time periods. Optionally, multiple responsive or remedial actions may be taken (as opposed to only one action).

Figure 4:
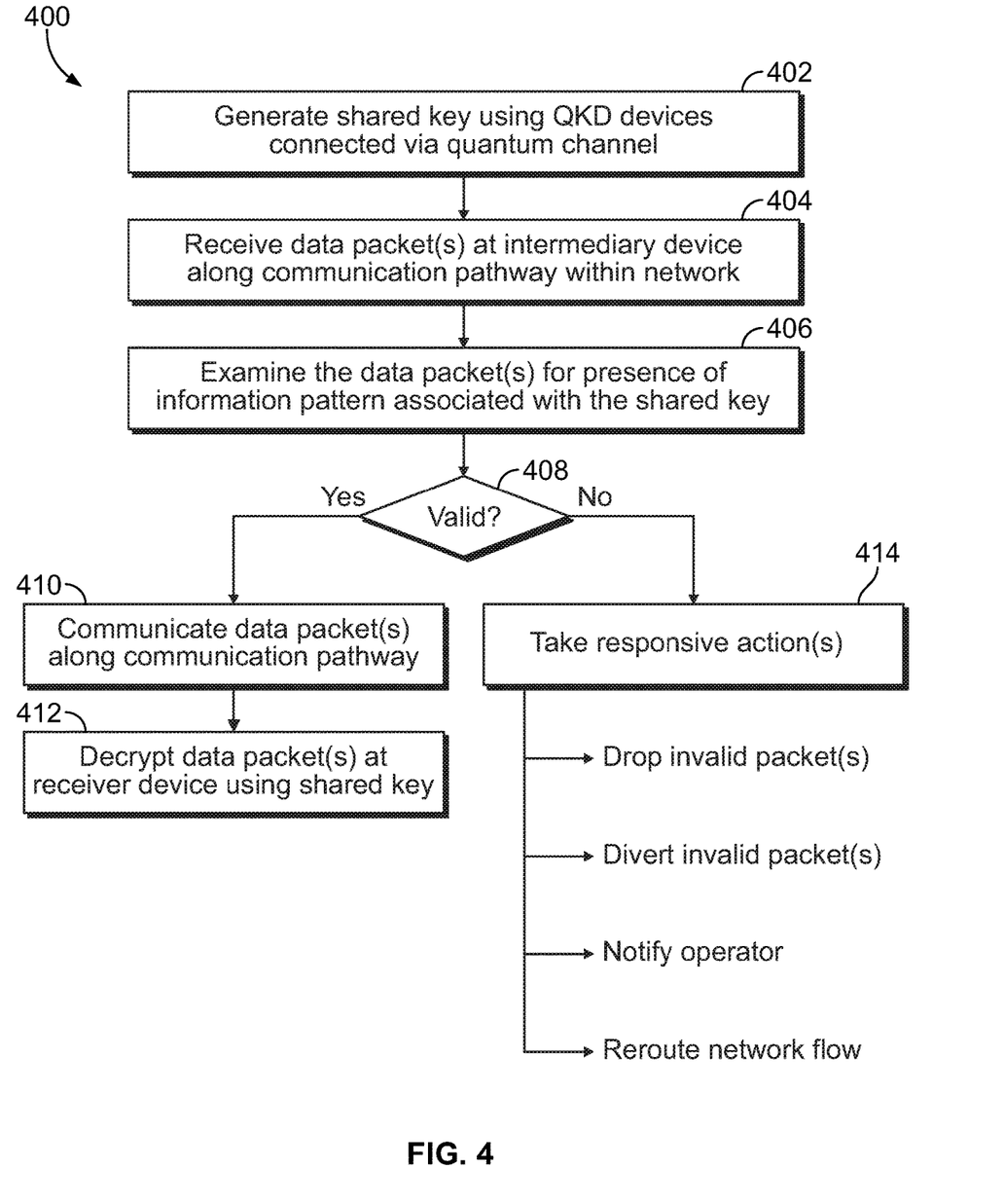
FIG. 4 is a flow chart of a method for authenticating data packets within a network in accordance with embodiments herein.

FIG. 4 is a flow chart of a method 400 for authenticating data packets within a network according to an embodiment. In one embodiment, the communication system 200 of FIG. 2 may be used to perform the method 400. The method 400 may increase network cybersecurity by utilizing quantum-generated shared keys to authenticate data packets midstream, prior to the data packets arriving at the scheduled destination. At 402, a shared key is generated using a first QKD device and a second QKD device connected to each other by a quantum channel. The shared key is generated based on quantum states transmitted along the quantum channel. For example, the quantum states may be defined by one or more photons emitted into an optical fiber that defines the quantum channel. The photons may be emitted by the first QKD device, the second QKD device, or both.

At 404, one or more data packets are received at an intermediary device disposed along a communication pathway within a network between a sender device and a receiver device. The intermediary device is communicatively connected to the first QKD device and receives either the shared key or a transformation of the shared key from the QKD device.

At 406, the one or more data packets are examined at the intermediary device for a presence of an information pattern within the data packets that is associated with the shared key. At 408, it is determined whether each of the data packets received at the intermediary device are valid. If the information pattern is determined to be present, the data packet is authenticated and classified as a valid packet. On the other hand, if the information pattern is not present in a designated segment of a data packet, the data packet is not authenticated and is classified as an invalid packet. At 410, the valid packets are communicated, via the intermediary device, along the communication pathway towards the receiver device during a designated time period according to a schedule. At 412, the receiver device receives the valid packets and decrypts information within the valid packets using the shared key that is received directly from the first QKD device.

At 414, one or more responsive and/or remedial actions are taken with respect to the invalid packets. For example, the invalid packets are prevented from being communicated along the communication pathway, which may violate a schedule for the network. In another example, the invalid packets may be dropped or diverted to another device outside of the communication pathway for further analysis. Another remedial or responsive action may include generating a control signal to notify an operator via a sound effect, lighting effect, vibrational or tactile effect, providing a text-based or voice-based message, or the like. Still another responsive action may include rerouting network flow based on the detection of the invalid packets. For example, after detecting an invalid packet or multiple invalid packets, additional packets within the TSN flow received at the node or switch may be automatically rerouted from the scheduled flow paths.

Optionally, the method may also include generating the information pattern that is associated with the shared key by using a hash function to scramble the shared key. The method may periodically generate a new shared key and may use the new shared key to authenticate one or more data packets representing second message.

The embodiments described herein provide a communication system that extends the use of shared keys beyond quantum-key-enabled devices for use in authenticating data packets (e.g., signals, frames, messages, etc.) being communicated through a network before the data packets reach the intended recipient devices. The shared keys are used to examine and authenticate data packets within the network flow to protect the integrity and security of the network flow. For example, intermediary devices (e.g., switches, bridges, or the like) disposed mid-stream between two communicating end devices may perform authentication on the received packets. By authenticating packets at the intermediary device, any damage or disruption caused by invalid packets can be reduced relative to allowing these invalid packets to continue to flow through the network. Coupling the quantum-generated shared keys with time-sensitive networks provides scheduling and tracking support to ensure that all devices are utilizing the correct keys.

The quantum devices described herein can include any and all systems and methods that utilize quantum mechanics, including the use of quantum states to transmit key-based information through a quantum channel that may be used to allow two remote devices to securely communicate and share data and information. Example quantum states include photon polarization states, orthogonal states, other conjugate variable states, entangled based states, or the like. A quantum channel described herein may include any pathway through which quantum states pass to communicate information or data between devices using properties of quantum mechanics. Example quantum channels include pathways through optical fiber, a bundle of optical fiber, or the like.

The classical devices described herein can include devices, communication links (e.g., cables, wires, optical fibers, etc.), components, and the like, that provide or enable communication without utilizing quantum mechanics (e.g., without transmitting quantum states). The classical devices may convey or transmit signals using electrical wires, optical fibers, and/or wireless media. Systems that include such components include, but are not limited to Ethernet, phone line systems, broadband systems, systems using twisted pair cables, systems using coaxial cables, cellular systems, routers, fiber optic systems, Internet-based systems, or the like.

In one or more embodiments, a communication system includes a first quantum key distribution device and an intermediary device. The first quantum key distribution device is configured to be coupled to a second quantum key distribution device over a quantum channel and to generate a shared key with the second quantum key distribution device based on a quantum state transmitted along the quantum channel. The intermediary device is disposed along a communication pathway within a network between a sender device and a receiver device. The intermediary device is communicatively connected to the first quantum key distribution device and configured to utilize the shared key to authenticate one or more data packets communicated from the sender device along the communication pathway by examining the one or more data packets for a presence of an information pattern that is associated with the shared key.

Optionally, responsive to determining that a data packet of the one or more data packets is a valid packet that includes the information pattern, the intermediary device is configured to communicate the valid packet along the communication pathway towards the receiver device during a designated time period according to a schedule.

Optionally, the communication system further includes the receiver device which is configured to receive the valid packet along the communication pathway. The receiver device is configured to receive the shared key from the first quantum key distribution device. The receiver device is configured to decrypt information within the valid packet using the shared key.

Optionally, responsive to determining that a data packet of the one or more data packets is an invalid packet that lacks the information pattern, the intermediary device is configured to prevent communication of the invalid packet along the communication pathway in violation of a schedule.

Optionally, responsive to determining that a data packet of the one or more data packets is an invalid packet that lacks the information pattern, the intermediary device is configured to one or more of redirect the invalid packet to a device outside of the communication pathway or generate a control signal to notify an operator of the invalid packet.

Optionally, the network is a time-sensitive network and the communication system includes one or more processors that determine a schedule for communicating along the time-sensitive network. The one or more processors determine the schedule to accommodate time spent by the intermediary device to authenticate the one or more data packets.

Optionally, the intermediary device is configured to examine only a designated segment of each of the one or more data packets received.

Optionally, the intermediary device includes a ternary content addressable memory (TCAM). Optionally, the TCAM is disposed on a chip that is conductively coupled to the intermediary device.

Optionally, the information pattern associated with the shared key is a hash-based message authentication code (HMAC) generated based on the shared key.

Optionally, the network is an Ethernet network, and the intermediary device is an Ethernet switch connected via classical communication links to the sender and receiver devices.

Optionally, the communication system further includes the sender device which is configured to receive the shared key from the second quantum key distribution device. The sender device is configured to embed the information pattern associated with the shared key within a designated segment of each of the one or more data packets.

In one or more embodiments, a method includes generating a shared key using a first quantum key distribution device and a second quantum key distribution device connected to each other by a quantum channel. The shared key is generated based on a quantum state transmitted along the quantum channel. The method includes receiving one or more data packets at an intermediary device disposed along a communication pathway within a network between a sender device and a receiver device. The intermediary device is communicatively connected to the first quantum key distribution device. The method also includes authenticating the one or more data packets by examining the one or more data packets at the intermediary device for a presence of an information pattern that is associated with the shared key.

Optionally, responsive to determining that a data packet of the one or more data packets is a valid packet that includes the information pattern, the method includes communicating, via the intermediary device, the valid packet along the communication pathway towards the receiver device during a designated time period according to a schedule.

Optionally, the method further includes receiving the valid packet at the receiver device via the communication pathway, receiving the shared key at the receiver device from the first quantum key distribution device, and decrypting information within the valid packet at the receiver device using the shared key.

Optionally, responsive to determining that a data packet of the one or more data packets is an invalid packet that lacks the information pattern, the method includes preventing communication of the invalid packet along the communication pathway in violation of a schedule.

Optionally, the method further includes generating the information pattern that is associated with the shared key by using a hash function to scramble the shared key.

Optionally, the one or more data packets represent a first message communicated through the network, and the method further comprises generating a new shared key, receiving one or more data packets representing a second message at the intermediary device, and utilizing the new shared key to authenticate the one or more data packets of the second message.

In one or more embodiments, a communication system includes a first quantum key distribution device, a receiver device, and an intermediary device. The first quantum key distribution device is configured to be coupled to a second quantum key distribution device over a quantum channel and to generate a shared key with the second quantum key distribution device based on a quantum state transmitted along the quantum channel. The receiver device is disposed within a network and configured to receive the shared key from the first quantum key distribution device via a first communication link. The intermediary device is disposed along a communication pathway within the network between the receiver device and a sender device that communicates one or more data packets along the communication pathway. The intermediary device is communicatively connected to the first quantum key distribution device via a different, second communication link. The intermediary device is configured to utilize the shared key to authenticate at least one of the one or more data packets as a valid packet by detecting, in each valid packet, an information pattern that is associated with the shared key. The receiver device is configured to receive the valid packet along the communication pathway and decrypt information within the valid packet using the shared key received via the first communication link.

Optionally, the communication system further includes the sender device which is configured to receive the shared key from the second quantum key distribution device. The sender device is configured to embed the information pattern associated with the shared key within a designated segment of each of the one or more data packets. The intermediary device may be configured to examine only the designated segment of each of the one or more data packets to detect the information pattern.

Optionally, the network is a time-sensitive network and the communication system includes one or more processors that determine a schedule for communications through the time-sensitive network. The one or more processors determine the schedule to accommodate time spent by the intermediary device to authenticate the one or more data packets.

While the present disclosure has been described in terms of one or more particular embodiments, it is apparent that other forms could be adopted by one skilled in the art. It is to be understood that the use of "comprising" in conjunction with the alloy compositions described herein specifically discloses and includes the embodiments wherein the alloy compositions "consist essentially of" the named components (i.e., contain the named components and no other components that significantly adversely affect the basic and novel features disclosed), and embodiments wherein the alloy compositions "consist of" the named components (i.e., contain only the named components except for contaminants which are naturally and inevitably present in each of the named components).

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A communication system comprising:
a first quantum key distribution device including one or more processors and configured to be coupled to a second quantum key distribution device, which includes one or more processors, over a quantum channel and to generate a shared key with the second quantum key distribution device based on a quantum state transmitted along the quantum channel; and
an intermediary device disposed along a communication pathway within a network, the intermediary device representing a switch or a bridge within the network communicatively connected to the first quantum key distribution device, the intermediary device configured to utilize the shared key to authenticate one or more data packets communicated along the communication pathway and intended for receipt at a receiver computing device prior to the one or more data packets arriving at the receiver computing device, wherein the intermediary device authenticates by examining the one or more data packets for a presence of an information pattern that is associated with the shared key.

2. The communication system of claim 1, wherein, responsive to determining that a data packet of the one or more data packets is a valid packet that includes the information pattern, the intermediary device is configured to communicate the valid packet along the communication pathway towards the receiver computing device during a designated time period according to a schedule.

3. The communication system of claim 2, further comprising the receiver computing device, wherein the receiver computing device is configured to receive the valid packet along the communication pathway and is configured to receive the shared key from the first quantum key distribution device, wherein the receiver computing device is configured to decrypt information within the valid packet using the shared key.

4. The communication system of claim 1, wherein, responsive to determining that a data packet of the one or more data packets is an invalid packet that lacks the information pattern, the intermediary device is configured to prevent communication of the invalid packet along the communication pathway in violation of a schedule.

5. The communication system of claim 1, wherein, responsive to determining that a data packet of the one or more data packets is an invalid packet that lacks the information pattern, the intermediary device is configured to one or more of redirect the invalid packet to a device outside of the communication pathway or generate a control signal to notify an operator of the invalid packet.

6. The communication system of claim 1, wherein the network is a time-sensitive network and the communication system includes one or more processors that determine a schedule for communicating along the time-sensitive network, wherein the one or more processors determine the schedule to accommodate time spent by the intermediary device to authenticate the one or more data packets.

7. The communication system of claim 1, wherein the intermediary device is configured to examine only a designated segment of each of the one or more data packets received.

8. The communication system of claim 1, wherein the intermediary device includes a ternary content addressable memory (TCAM) disposed on a chip.

9. The communication system of claim 1, wherein the information pattern associated with the shared key is a hash-based message authentication code (HMAC) generated based on the shared key.

10. The communication system of claim 1, wherein the network is an Ethernet network and the intermediary device is an Ethernet switch connected via classical communication links to the receiver computing device.

11. The communication system of claim 1, further comprising a sender computing device that generates the one or more data packets, wherein the sender computing device is configured to receive the shared key from the second quantum key distribution device and to embed the information pattern associated with the shared key within a designated segment of each of the one or more data packets.

12. The communication system of claim 1, wherein the intermediary device is discrete and spaced apart from the receiver computing device along the network via at least one of electrical cables or optical cables.

13. A method comprising:
generating a shared key using a first quantum key distribution device and a second quantum key distribution device connected to each other by a quantum channel, wherein each of the first and second quantum key distribution devices includes a respective one or more processors and the shared key is generated based on a quantum state transmitted along the quantum channel;
receiving one or more data packets at an intermediary device disposed along a communication pathway within a network, the intermediary device representing a switch or a bridge within the network communicatively connected to the first quantum key distribution device; and
authenticating the one or more data packets within the communication pathway intended for receipt at a receiver computing device prior to the one or more data packets arriving at the receiver computing device by examining the one or more data packets at the intermediary device for a presence of an information pattern that is associated with the shared key.

14. The method of claim 13, wherein, responsive to determining that a data packet of the one or more data packets is a valid packet that includes the information pattern, the method includes communicating, via the intermediary device, the valid packet along the communication pathway towards the receiver computing device during a designated time period according to a schedule.

15. The method of claim 14, further comprising receiving the valid packet at the receiver computing device via the communication pathway;
receiving the shared key at the receiver computing device from the first quantum key distribution device; and
decrypting information within the valid packet at the receiver computing device using the shared key.

16. The method of claim 13, wherein, responsive to determining that a data packet of the one or more data packets is an invalid packet that lacks the information pattern, the method includes preventing communication of the invalid packet along the communication pathway in violation of a schedule.

17. The method of claim 13, further comprising generating the information pattern that is associated with the shared key by using a hash function to scramble the shared key.

18. A communication system comprising:
a first quantum key distribution device configured to be coupled to a second quantum key distribution device over a quantum channel and to generate a shared key with the second quantum key distribution device based on a quantum state transmitted along the quantum channel, wherein each of the first and second quantum key distribution devices includes a respective one or more processors;

a receiver computing device disposed within a network and configured to receive the shared key from the first quantum key distribution device via a first communication link; and an intermediary device disposed along a communication pathway within the network between the receiver computing device and a sender computing device, the sender computing device configured to communicate one or more data packets along the communication pathway for receipt by the receiver computing device, the intermediary device communicatively connected to the first quantum key distribution device via a different, second communication link, wherein the intermediary device is discrete and spaced apart from each of the receiver computing device and the sender computing device via at least one of electrical cables or optical cables, the intermediary device configured to receive the one or more data packets prior to the one or more data packets arriving at the receiver computing device, and to utilize the shared key to authenticate at least one of the one or more data packets as a valid packet by detecting, in the valid packet, an information pattern that is associated with the shared key, and wherein the receiver computing device is configured to receive the valid packet along the communication pathway and decrypt information within the valid packet using the shared key received via the first communication link.

19. The communication system of claim 18, further comprising the sender computing device, wherein the sender computing device is configured to receive the shared key from the second quantum key distribution device and to embed the information pattern associated with the shared key within a designated segment of each of the one or more data packets.

20. The communication system of claim 18, wherein the network is a time-sensitive network and a schedule for communications through the time-sensitive network accommodates time spent by the intermediary device to authenticate the one or more data packets.

21. The communication system of claim 18, wherein the intermediary device represents a switch or a bridge within the network.

* * * * *